«12» United States Patent
Covault

(10) Patent No.: US 7,342,761 B2
(45) Date of Patent: Mar. 11, 2008

(54) APPARATUS AND METHOD FOR LIMITING APPLICATION OF ELECTRICAL POWER TO A LOAD

(75) Inventor: Jack L. Covault, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 540 days.

(21) Appl. No.: 10/737,226

(22) Filed: Dec. 16, 2003

(65) Prior Publication Data

US 2005/0128657 A1    Jun. 16, 2005

(51) Int. Cl.
*H02H 3/08* (2006.01)
*H02H 9/02* (2006.01)
*H02H 3/00* (2006.01)
(52) U.S. Cl. ............... 361/93.1; 361/93.7; 361/78; 361/79
(58) Field of Classification Search ......... 361/93.1, 361/93.7, 78–79
See application file for complete search history.

(56) References Cited

U.S. PATENT DOCUMENTS

| 5,801,522 | A | 9/1998 | McKenzie |
| 6,515,840 | B2* | 2/2003 | Covi et al. ............ 361/93.1 |
| 6,621,259 | B2* | 9/2003 | Jones et al. .......... 324/123 C |
| 6,646,847 | B2* | 11/2003 | Poe et al. ............. 361/93.1 |

* cited by examiner

*Primary Examiner*—Michael Sherry
*Assistant Examiner*—Dharti H Patel
(74) *Attorney, Agent, or Firm*—Keith M. Baxter; Alexander R. Kuszewski

(57) ABSTRACT

The application of electric power from a power source to a load is controlled by detecting the magnitude of electric current flowing to the load and producing a first signal level that is indicative of that magnitude. The first signal level is compared to a reference signal level which comparison produces an output signal. Either the first signal level or the reference signal level is altered in response to variation of voltage applied to the load. This results in the output signal indicating when electric power consumed by the load exceeds a threshold level. The flow of electric current from the power source to the load then is controlled in response to the output signal.

9 Claims, 1 Drawing Sheet

APPARATUS AND METHOD FOR LIMITING APPLICATION OF ELECTRICAL POWER TO A LOAD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to circuits which control supplying electricity to a load, and more particularly to circuits which limit the amount of power consumed by a load.

2. Description of the Related Art

Many types of electrical apparatus are powered by direct current. The direct current may be derived from a battery or from an alternating to direct current power supply. For example, the power supply converts 120 volt or 250 volt alternating current from a utility company into a desired lower DC voltage level compatible with the electronic circuitry.

The voltage potential of these current sources can vary in magnitude for a number of reasons. For instance, the output voltage level of an AC to DC power supply can fluctuate with variation of the AC voltage into the power supply. The output voltage also can vary due to changes in the amount of current being drawn by loads attached to the power supply. The output voltage from a battery decreases as the charge on the battery depletes and can increase while the battery is recharging.

It often is beneficial to limit the amount of electric current that is allowed to enter or flow through electrical equipment. Limiting the amount of electric current to below a defined level can prevent damage to the equipment. Such current limiting also may prevent a failure of one component from causing damage to other components.

Current limiting circuits are well known and commonly detect voltage across a sensing resistor through which all or a defined portion of the electric current to a load flows. The level of the sensed voltage is in proportion to the magnitude of the electric current. That sense voltage level is compared to a reference voltage level that corresponds to the desired current limit. The result of that comparison can be used to control the flow of current to the load. For example, if the reference voltage level is exceeded, indicating an excessively high current flowing to the load, a disconnect device can be activated to terminate that current flow and prevent damage to the load.

Under certain circumstances it is desirable to limit the input power to a circuit to less than a prescribed wattage level prescribed. For example, equipment can be designed with greater latitude for clearances between conductors and other parameters of the circuit layout, when the equipment draws less then 200 volt-amperes. Conventional design standards are more stringent for equipment that may consume more electrical power. Therefore, it is desirable to ensure that this power level is not exceeded so that a less expensive and complicated circuit layout can be utilized in the equipment.

However, merely regulating the voltage or current applied to the apparatus does not ensure that the circuitry will not draw in excess of the desired power limit. For example, if the apparatus is nominally powered at 15 volts and consumes 150 watts of power, its input current is 10 amps. A power supply that limits the current level to 10 amps could allow the apparatus to consume more than a 150 watts when the input voltage rises above 15 volts. In this example if the supply voltage is greater than 20 volts, a design guideline of 200 volt-amperes is exceeded. As noted previously, such supply voltage variation is not uncommon, especially among battery powered equipment, which can vary significantly depending upon the charge level of the battery. For example, it is not unusual for a battery voltage to be relatively high when a battery charger is active and then decrease to about half that voltage level when battery is the discharged.

Therefore, it is desirable to provide a reliable, inexpensive circuit which limits the power consumption of an electrical load to less than a predefined level.

SUMMARY OF THE INVENTION

An apparatus is provided to perform a method which controls the application of electric power from a power source to a load. That apparatus comprises a current sensing circuit which detects the magnitude of electric current flowing to the load and produces a first signal level indicating that magnitude. A comparator is connected to the current sensing circuit and has a first input to which the first signal level is applied, a second input to which a reference signal level is applied. The comparator produces an output signal in response to comparing the first signal level and the reference signal level.

A circuit branch is connected to the comparator and alters either the first signal level or the reference signal level in response to variation of voltage applied to the load. A first embodiment of the apparatus provides a circuit branch that alters the first signal level and a second embodiment incorporates a different circuit branch which alters the reference signal level. Such alteration results in the output signal indicating when electric power consumed by the load exceeds a threshold level. A device that is connected to the comparator output, controls the flow of electric current from the power source to the load in response to the output signal.

DETAILED DESCRIPTION OF THE INVENTION

Figure 1:
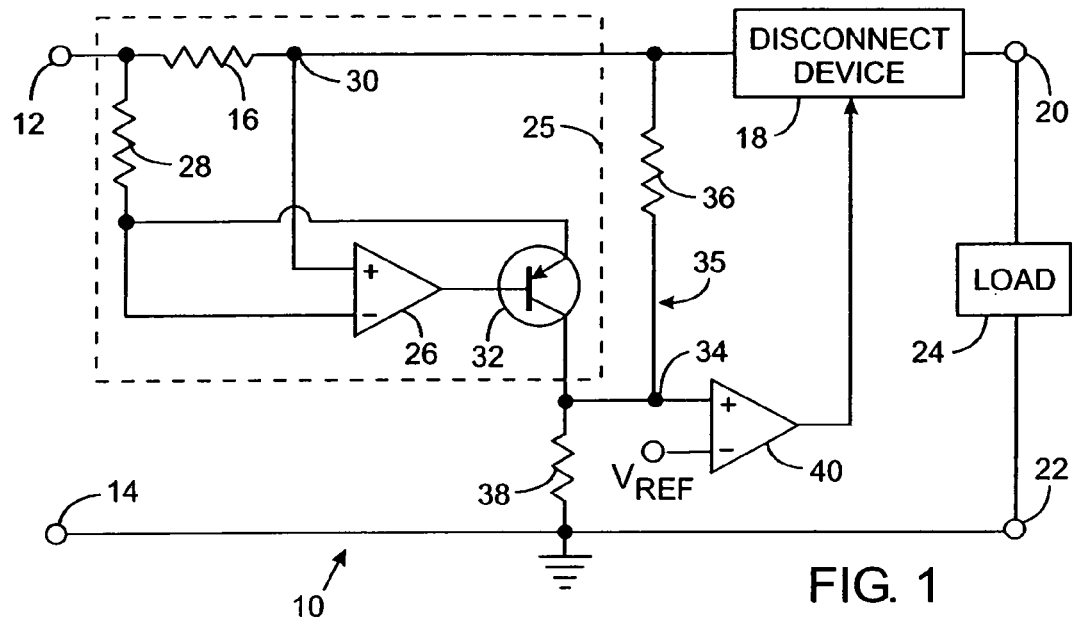
FIG. 1 is a schematic diagram of a first embodiment of a circuit for limiting the input power to a load.

With initial reference to FIG. 1, a first current limiting circuit 10 for a power supply has a pair of input terminals 12 and 14 across which a DC voltage is applied. The first input terminal 12 receives the positive voltage line, while the second input terminal 14 is connected to the circuit ground. A current sensing resistor 16 is connected between the first input terminal 12 and a disconnect device 18, which may comprise a semiconductor switch, an electromechanical relay, contactor or similar switching device. The disconnect device controls the flow of current to a first output terminal 20. A second output terminal 22 is connected to circuit ground via the second input terminal. The load 24 being powered is connected across the two output terminals 20 and 22.

An operational amplifier 26 has an inverting input coupled to the first input terminal 12 via an input resistor 28. The non-inverting input terminal of the operational amplifier 26 is connected directly to a supply line 30 between the current sensing resistor 16 and the disconnect device 18. Thus the inputs of the operational amplifier 26 are coupled to opposites sides of the current sensing resistor 16. The signal at the output of the operational amplifier 26 corresponds to the voltage across the current sensing resistor 16 and thus, is proportional to the current flowing through that resistor to the load 24. The current sensing resistor 16, input resistor 28 and the operational amplifier 26 comprise a current sensing circuit 25.

The output of the operational amplifier 26 is connected to the base, or control, electrode of a transistor 32 which also is part of the current sensing circuit 25. The conduction path of the transistor 32 is connected between the inverting input of the operational amplifier 26 and an intermediate node 34. Specifically, the transistor 32 is a PNP type with an emitter connected to the inverting input of the operational amplifier 26 and a collector connected to the intermediate node 34. The intermediate node 34 is coupled to the supply line by a power limit resistor 36 and to the circuit ground by a bias resistor 38.

The intermediate node 34 also is connected directly to the non-inverting input of a comparator 40 which has an inverting input connected to a source of a constant reference voltage $V_{REF}$. The output of the comparator 40 is connected to the control input of the disconnect device 18, thereby controlling the operation of that latter device.

During the operation of the first current limiting circuit 10, the electric current flowing through the current sensing resistor 16 produces a voltage across that device that is proportional to the magnitude of that electric current. That voltage difference produces a voltage level at the output of the operational amplifier 26 indicative of the voltage across the current sensing resistor 16 and thus the current magnitude. The output of the operational amplifier 26 controls the conduction level of the transistor 32, thereby causing a voltage to be produced across the bias resistor 38 that corresponds to the magnitude of current flowing to the load 24. The comparator 40 compares the voltage level at the intermediate node 34, i.e. the voltage across the bias resistor 38, to the reference voltage $V_{REF}$ that defines a limit for the current. When the voltage at the intermediate node 34 exceeds this reference voltage level, which occurs when the current limit has been exceeded, the output of the comparator 40 changes states, which causes the disconnected device 18 to terminate the flow of electric current to the load 24.

For example, assume that the nominal supply voltage at the first input terminal is 15 volts and the first current limiting circuit 10 typically must allow 10 amps of current to flow to the load which normally consumes 150 watts. However, when the supply voltage exceeds 20 volts while the load continues to draw 10 amps, the power consumption now is greater than the 200 volt-ampere guideline. To prevent this from occurring, the power limit resistor 36, in circuit branch 35, modulates the current sense voltage at the intermediate node 34 in response to variation of the supply voltage at the first input terminal 12. In the above example if the supply voltage rises from 15 to 25 volts, more current flows through the power limit resistor 36 which raises the voltage across the bias resistor 38 and thus, the voltage level at the intermediate node 34. The rise in the voltage at the intermediate node 34, connected to the non-inverting input of the comparator 40, causes the output of the comparator to change states at a lower current level than when the supply voltage was at 15 volts. By the proper choice of resistor values in the first current limiting circuit 10, the voltage developed across the bias resistor 38 can vary in a way that causes the comparator 40 to switch at a constant input current/input voltage product, thus resulting in a constant power limit.

The first current limiting circuit 10 senses the current flowing to the load 24 and limits the magnitude of that current flow. However, the threshold at which the current limiting occurs is varied in response to changes in the voltage of the electricity applied to the load. That process ensures that the power consumption of the load is limited to a predefined amount.

Figure 2:
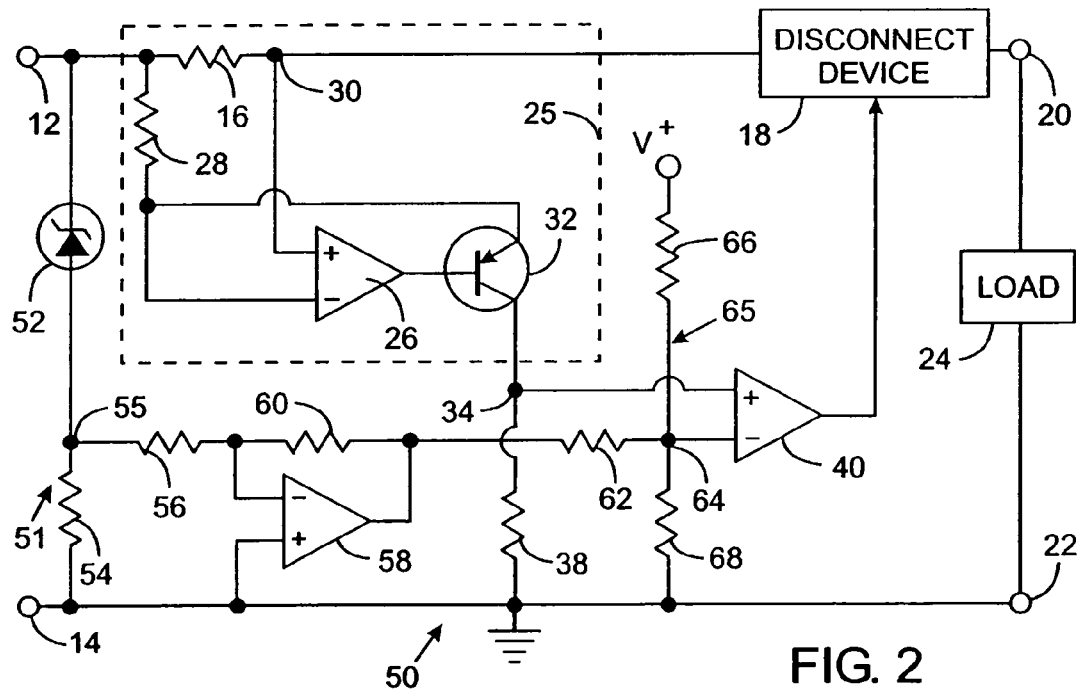
FIG. 2 is a schematic diagram of a second embodiment of a circuit for limiting the input power to a load.

The first current limiting circuit 10 in FIG. 1 modulates the voltage that corresponds to the current level, in response to changes in the level of the supply voltage. Alternatively, the modulation in response to the supply voltage variation can alter the level of the reference voltage applied to the comparator to produce a similar power level limiting. This alternative second current limiting circuit 50 is illustrated in FIG. 2. This limiting circuit 50 contains the components of the first input circuit with the exception of the power limit resistor 36. Elements of this alternative circuit that are in common with the first current limiting circuit 10 in FIG. 1 have been assigned identical reference numerals.

The second current limiting circuit 50 has an additional circuit branch 51 that has a Zener diode 52 connected in series with a first resistor 54 between the first and second input terminals 12 and 14. The breakdown voltage of Zener diode 52 is the nominal operating voltage of the load. The sensing node 55 between the Zener diode 52 and the first resistor 54 is coupled by a second resistor 56 to the inverting input of a second operational amplifier 58. The non-inverting input of the second operational amplifier 58 is connected directly to circuit ground via the second input terminal 14. Third and fourth resistors 60 and 62 are connected in series between the non-inverting input of the second operational amplifier 58 and the inverting input of the comparator 40. The output of the second operational amplifier 58 is connected to a junction between the third and fourth resistors 60 and 62.

A voltage divider 65 is formed by a fifth resistor 66 and a sixth resistor 68 connected in series between a source of positive voltage (V+) and circuit ground. A reference node 64 between the fifth and sixth resistors 66 and 68 is connected to the inverting input of the comparator 40 to apply a reference voltage level to that input. Although the voltage divider 65 produces a constant reference voltage level, the actual voltage at the inverting input of the comparator 40 is modulated by the variation of the input voltage.

The second current limiting circuit 50 is configured based on the nominal current and voltage values during normal operation of the load 24. Using parameters similar to the previous example, assume that the load 24 normally operates at a supply voltage of 15 volts and draws 10 amps of current for a nominal power consumption of 150 watts. When 10 amps flows through the current sensing resistor 16, the current sensing circuit 25 will produce a given voltage (e.g. 1 volt) at the intermediate node 34. The voltage divider 65 comprising the fifth and sixth resistors 66 and 68 is configured to produce that given voltage level (1 volt) at the inverting input of the comparator 40. The breakdown voltage of the Zener diode 52 is 15 volts so that under these operating conditions it is non-conducting and the branch circuit 51 does not affect the voltage at reference node 64. Therefore, both inputs to the comparator 40 are at the same voltage level and its output does not trigger the disconnect device 18.

Until the Zener diode 52 breaks down and begins conducting, the second current limiting circuit 50 functions as a conventional current limiter. However, when the supply voltage at the first input terminal 12 exceeds the breakdown voltage (e.g. 15 volts), the Zener diode 52 conducts current. This causes the second operational amplifier 58 in the circuit branch 51 to produce a negative output voltage that is proportional to the amount that the supply voltage exceeds the Zener breakdown voltage. This negative output voltage pulls down the voltage produced by the at the voltage divider 65 at the reference node 64. The alteration of the voltage level at the inverting input of the comparator 14 effects the threshold of the comparator so that it will change states when a lower voltage level occurring at the intermediate node 34. Thus, the comparator will change states at a proportionally lower supply current level as the input voltage exceeds the voltage limit set by the Zener diode 52. This change in threshold maintains a constant input current/input voltage product, thus maintaining a fixed power limit for the load 24.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An apparatus for limiting the power consumed by electrical equipment circuits that may be connected to power sources providing varying voltages, that apparatus comprising:
    load circuits having a designed power limit;
    input power processing circuits positioned between the load circuits and a power source, the input power processing circuits including:
    a current sensing circuit that detects a magnitude of electric current flowing to the load circuits and producing a first signal level that indicates the magnitude of current;
    a comparator connected to the current sensing circuit and having a first input to which the first signal level is applied, a second input connected to a source of a reference signal level, and a comparator output at which an output signal is produced in response to comparing the first signal level and the reference signal level;
    a circuit branch connected to the comparator and which alters one of the first signal level and the reference signal level in response to determination of voltage applied to the load circuits, which results in an output signal indicating when electric power consumed by the load exceeds a threshold level;
    and a device connected to the comparator output and disconnecting flow of electric current from the power source to the load circuits in response to the output signal
    whereby electrical power is blocked from entering the load circuits at a current threshold value that is dependant upon the voltage applied to the load circuits to limit power to the load circuits,
    wherein the circuit branch comprises: a circuit element connected to a current sensing resistor and producing a signal indicating when voltage applied to the load circuits exceeds a defined magnitude; and a second operational amplifier having an input coupled to the circuit element and having a second output connected to the second input of the comparator.

2. An apparatus for limiting the power consumed by electrical equipment circuits that may be connected to power sources providing varying voltages, that apparatus comprising:
    load circuits having a designed power limit;
    input power processing circuits positioned between the load circuits and a power source, the input power processing circuits including:
    a current sensing circuit that detects a magnitude of electric current flowing to the load circuits and producing a first signal level that indicates the magnitude of current;
    a comparator connected to the current sensing circuit and having a first input to which the first signal level is applied, a second input connected to a source of a reference signal level, and a comparator output at which an output signal is produced in response to comparing the first signal level and the reference signal level;
    a circuit branch connected to the comparator and which alters one of the first signal level and the reference signal level in response to determination of voltage applied to the load circuits, which results in an output signal indicating when electric power consumed by the load exceeds a threshold level;
    and a device connected to the comparator output and disconnecting flow of electric current from the power source to the load circuits in response to the output signal
    whereby electrical power is blocked from entering the load circuits at a current threshold value that is dependant upon the voltage applied to the load circuits to limit power to the load circuits,
    wherein the circuit branch comprises: a first resistor a Zener diode connected in series with the first resistor between a current sensing resistor and circuit ground, thereby forming a sensing node between the first resistor and the Zener diode; a second resistor, a third resistor and a fourth resistor connected in series coupling the sensing node to the second input of the comparator; and second operational amplifier having one input connected to a point between the second resistor and the third resistor, another input connected to the circuit ground, and an output connected to another point between the third resistor and the fourth resistor.

3. An apparatus for controlling application of electric power from a power source to a load, that apparatus comprising:
    an input terminal;
    a current sensing resistor connected between the input terminal and the load, wherein voltage across the current sensing resistor indicates a level of current flowing to the load;
    a first operational amplifier having a first input connected to a first side of the current sensing resistor, a second input connected to a second side of the current sensing resistor, and having a first output at which an output voltage is produced which indicates the level of current flowing to the load;

a comparator having a first comparator input coupled to the first output of the first operational amplifier, second comparator input connected to a source of a reference voltage, and a comparator output at which an output signal is produced;

a circuit element connected to the current sensing resistor and producing a control signal indicating an amount that voltage applied to the load exceeds a defined magnitude;

a second operational amplifier having an input coupled to the circuit element and having a second output connected to the second input of the comparator, wherein the second operational amplifier alters voltage at the second input in response to the control signal so that the output signal of the comparator indicates when power consumed by the load exceeds a threshold level;

and a disconnect device connected to the comparator output and selectively disconnecting the load from the power source in response to a signal at the comparator output, wherein the circuit element comprises a Zener diode;

further comprising: a first resistor coupling the Zener diode to circuit ground, thereby forming a sensing node between the first resistor and the Zener diode; and a second resistor, a third resistor and a fourth resistor connected in series between the sensing node and the second input of the comparator; wherein the input of the second operational amplifier is connected to a point between the second resistor and the third resistor, and the second output of the second operational amplifier is connected to another point between the third resistor and the fourth resistor.

4. The apparatus as recited in claim 3 further comprising a transistor having a control electrode connected to the output of the first operational amplifier, and having a conduction path that connects the first input of the first operational amplifier to the first comparator input.

5. The apparatus as recited in claim 3 further comprising a bias resistor coupling the one input of the comparator to circuit ground.

6. The apparatus as recited in claim 3 further comprising an input resistor coupling the first input of the operational amplifier to the first side of the current sensing resistor.

7. An apparatus for limiting power consumption by a load that may be connected to power sources of varying voltages, the apparatus comprising:

an input terminal that receives a value indicative of an input voltage to a load, the load configured to operate during normal operation with a power consumption value that is less than a constant power consumption limit value; and a current limiting circuit to the input terminal and operative to disconnect the load from the input voltage when current to the load exceeds a current threshold, and wherein the current threshold varies in response to variations in input voltage such that a product of the current threshold and input voltage is substantially equal to the constant power consumption limit value, wherein the current threshold is decrease in response to an increase in input voltage and the current threshold is increased in response to a decrease in input voltage.

8. The apparatus of claim 7 further comprising circuitry connected to receive the value and compare the value to the current threshold and modulate the input voltage based on the comparison to keep power to the load relatively constant.

9. The apparatus of claim 7 further comprising circuitry that compares the input voltage to a reference voltage for the current threshold and adjusts the current threshold so that the current threshold varies as a function of the input voltage to keep power to the load relatively constant.

* * * * *